(12) United States Patent
Swingler et al.

(10) Patent No.: US 11,972,489 B1
(45) Date of Patent: Apr. 30, 2024

(54) CLAIMS PROCESS ASSISTANCE USING MODELS

(71) Applicant: State Farm Mutual Automobile Insurance Company, Bloomington, IL (US)

(72) Inventors: Matthew Thomas Swingler, Normal, IL (US); Sunitha Garapati, Normal, IL (US); Timothy John Husarik, Normal, IL (US); Bradley J Walder, Congerville, IL (US); Surendranath Gummadi, Cantrall, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/239,185

(22) Filed: Apr. 23, 2021

Related U.S. Application Data

(60) Provisional application No. 63/015,462, filed on Apr. 24, 2020.

(51) Int. Cl.
*G06Q 40/08* (2012.01)
*G06N 20/00* (2019.01)

(52) U.S. Cl.
CPC .............. *G06Q 40/08* (2013.01); *G06N 20/00* (2019.01)

(58) Field of Classification Search
CPC ......... G06Q 40/08; G06N 20/08; G06N 20/00
USPC .......................................................... 705/4
See application file for complete search history.

(56) References Cited

U.S. PATENT DOCUMENTS

| 7,149,347 | B1 | 12/2006 | Wnek |
| 7,346,523 | B1* | 3/2008 | Provost ................. G06Q 40/08 705/2 |
| 7,689,443 | B2 | 3/2010 | Pepoon et al. |
| 7,809,587 | B2 | 10/2010 | Dorai et al. |
| 7,849,030 | B2 | 12/2010 | Ellingsworth |
| 8,510,196 | B1 | 8/2013 | Brandmaier et al. |
| 8,738,552 | B2* | 5/2014 | Ellingsworth ........ G06F 16/353 706/20 |
| 9,378,527 | B2 | 6/2016 | Adams et al. |
| 9,591,061 | B2 | 3/2017 | Gupta et al. |
| 9,721,302 | B2 | 8/2017 | Tofte et al. |

(Continued)

FOREIGN PATENT DOCUMENTS

| CN | 110070665 A | 7/2019 |
| CN | 111652232 A | 9/2020 |
| TW | M574294 | 2/2019 |

*Primary Examiner* — Scott S Trotter
*Assistant Examiner* — William D Newlon
(74) *Attorney, Agent, or Firm* — Lee & Hayes, P.C.

(57) ABSTRACT

A claims processing system includes a claims assistance component to handle the flow of data through the claim process. The data may include any documents submitted for claim processing and may be generated by disparate sources. The system may train one or more machine learning (ML) models to classify the unstructured data by insurance categories and/or determine workflow. The system may assist a user through a user device to upload or capture claims data with the device. The claims assistance component may classify the data and verify the data classification before uploading it to the servers. In examples, the claims assistance component may determine that the file size of the data exceeds a cellular data transfer threshold and determine to compress the data and/or hold the transfer until a free connection is detected.

20 Claims, 7 Drawing Sheets

(56) References Cited

U.S. PATENT DOCUMENTS

| | | | |
|---|---|---|---|
| 9,830,663 B2 | 11/2017 | Roberts et al. | |
| 10,304,137 B1 | 5/2019 | Genser et al. | |
| 10,438,292 B1 * | 10/2019 | Rugel | G06V 40/10 |
| 10,650,231 B2 | 5/2020 | Jin et al. | |
| 10,867,171 B1 | 12/2020 | Contryman et al. | |
| 11,017,477 B1 * | 5/2021 | Hansen | G06N 5/025 |
| 11,461,816 B1 * | 10/2022 | Frens | G06Q 20/42 |
| 2004/0098664 A1 | 5/2004 | Adelman et al. | |
| 2004/0128182 A1 * | 7/2004 | Pepoon | G06Q 10/10 |
| | | | 705/4 |
| 2008/0281658 A1 * | 11/2008 | Siessman | G06Q 30/0283 |
| | | | 705/400 |
| 2009/0265385 A1 * | 10/2009 | Beland | G06F 16/258 |
| 2014/0019168 A1 * | 1/2014 | Albert | G06Q 10/10 |
| | | | 705/4 |
| 2014/0195891 A1 * | 7/2014 | Venkata Radha Krishna Rao | G06F 40/117 |
| | | | 715/234 |
| 2017/0301028 A1 * | 10/2017 | Strabel | G06F 16/24578 |
| 2019/0080416 A1 * | 3/2019 | Smith | G06Q 40/08 |
| 2019/0114370 A1 * | 4/2019 | Cerino | G06F 40/205 |
| 2019/0171986 A1 * | 6/2019 | Beznos | G06Q 10/0635 |
| 2020/0302165 A1 * | 9/2020 | Dang | G06N 20/00 |
| 2021/0081452 A1 * | 3/2021 | Mueller | G06N 5/04 |
| 2022/0366490 A1 * | 11/2022 | Duttagupta | G06F 16/353 |

* cited by examiner

CLAIMS PROCESS ASSISTANCE USING MODELS

PRIORITY

The present application claims the benefit of U.S. Provisional Patent Application No. 63/015,462, filed on Apr. 24, 2020, which is incorporated herein by reference in its entirety as if fully set forth herein.

BACKGROUND

Traditionally, insurance claims were handled by insurance adjusters walking customers through the entire claims process, including assisting with documentation gathering. However, in today's digital world, customers embracing smart technologies may prefer to expedite portions of the process. For instance, instead of scheduling and waiting for an adjuster to travel and take photos of the damaged car, most customers have smartphones that are capable of taking high resolution photos and videos. These customers can take photos and videos of not only the vehicle damage, but also of the accident scene right after the incident, when details are fresh. With the ability to quickly send and receive data, e.g., via a smartphone, customer expectations of timeliness in claims processing have similarly increased. Accordingly, there is a need for a smart claims processing system that could assist customers and other users with documentation gathering and sharing to promote timeliness.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
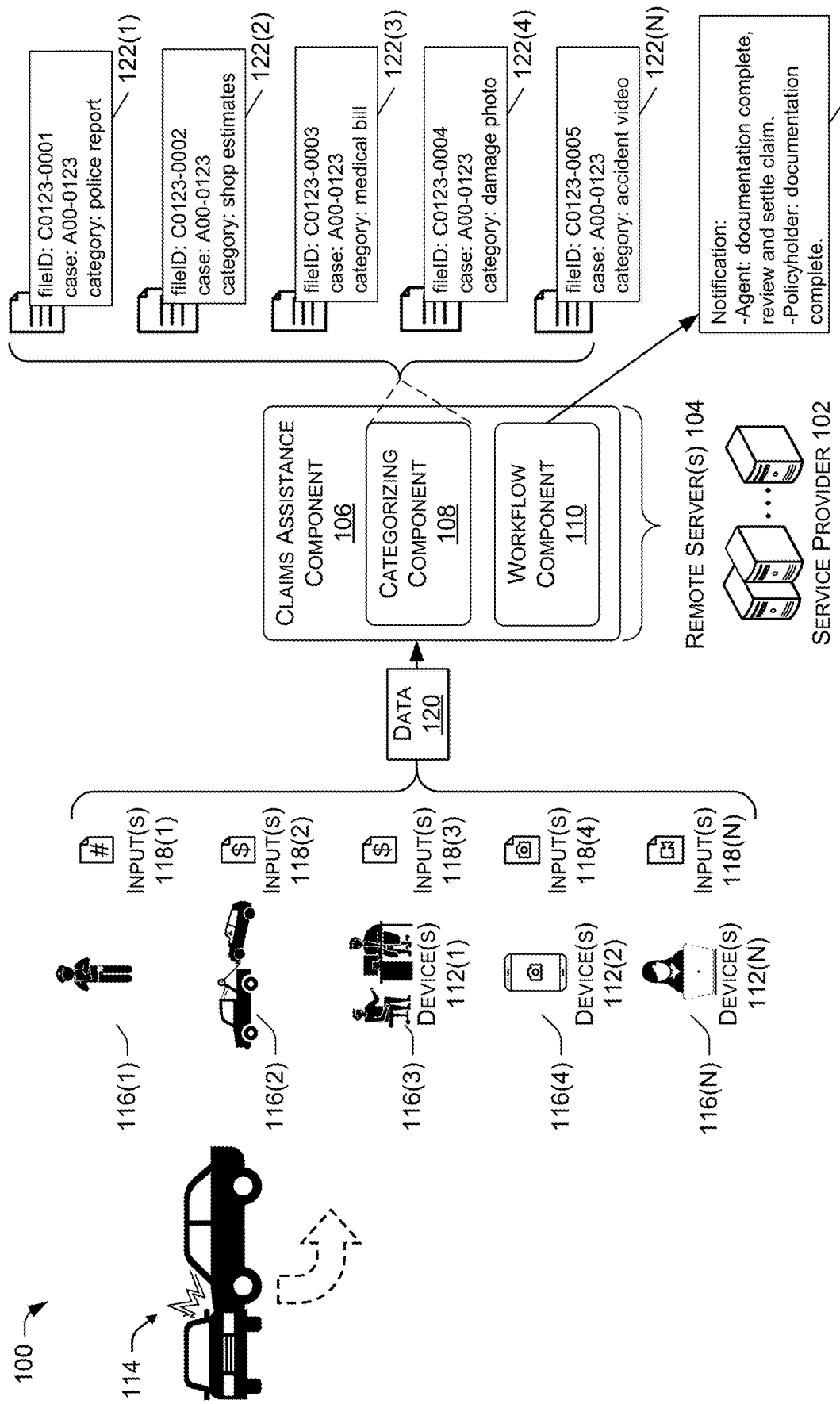
FIG. 1 illustrates an example environment including a claims processing system that includes a claims assistance component to receive input data from sources and to process the data to determine workflow, as described herein.

This disclosure is directed to a claims processing system including a claims assistance component that leverages machine learning models to classify documents and determine the workflow to advance the claims process. The documents may be received as unstructured data from one or more user devices and/or other sources. Initially, the unstructured data uploaded from user devices, emails, and other sources may be received by a server ("cloud server" or "the cloud") associated with an insurance service provider. The unstructured data may be manually classified and tagged by insurance categories. The tagged data ("labeled data" or "augmented data") may be used as training data. In some examples, the system may use the training data to train one or more machine learning (ML) model(s) to classify input data into insurance categories. The system may determine the workflow based on the insurance categories.

In some examples, the system may deploy the claims assistance component and/or trained model(s) to user devices to assist with document processing at the device level. The user devices may access the claims assistance component to upload documents for a particular claim to the servers. In various examples, the claims assistance component may include a user portal for a user to upload the documents and/or view documents that have been uploaded for the particular claim. Before the upload, the claims assistance component may use the trained model(s) to classify the documents by insurance categories and/or verify the data content to avoid uploading documents of questionable quality. The trained model(s) may also determine associated confidence levels for the classification. If the confidence level is low or below a threshold, the system may generate a prompt for the user to verify the classification. If the confidence level meets or satisfies a threshold, the data may be uploaded to the cloud servers for additional processing. Once uploaded, the system may perform advance processing techniques to analyze the content of the data to extract relevant information that may be used by an agent to complete the claim. For brevity, an "agent" refers to any user ("actor") assigned by the insurance service provider to handle, review, and/or process the claim. If additional information and/or documentation for a claim is still required, the system may determine the workflow to include notifying a particular actor(s) to provide the missing documents. If the documentation for a claim is complete, the system may determine the workflow to include notifying an agent or another actor to review the documents and settle the claim.

It is to be appreciated that, with constant improvement to camera quality, the number of cameras, and storage capacity on user devices (e.g., smartphones), the amount of data generated by photos and videos from these user devices can increase significantly. In response, the system needs to "learn" how to transfer and process data more efficiently. With the vast quantities of settled claims data, training data may be collected from samples of the settled claims data that are labeled with a severity level of a claim, the payout amount, and/or total loss claims. The system may train additional machine learning model(s) using this training data with samples of claims data labeled with severity levels. This trained model may classify data by severity levels and may increase the priority for the claim processing. Once trained, these machine learning model(s) can be transmitted to user devices to classify gathered data into the different severity levels. Based on the severity score or severity level of the data, the system components, running on user devices or on the cloud while communicating with the user devices, may determine the appropriate data transport method. For example, if the image data from a particular user device is classified as the highest level of severity, the system may determine that the data should be transmitted over the network to the cloud servers right away. In some examples, the system may compress or decrease the resolution of the image data for faster transport. However, if the data is classified as less than the highest level of severity, the system may select from any number of alternative data transport methods available to that user device, including but not limited to queueing the data to be transmitting over a Wi-Fi network when available or sending image data to another device or storage medium for transport, among other options.

Implementations of the techniques and systems described herein can improve existing technologies (e.g., claims processing technologies), and can improve the functioning of the systems with respect to conventional systems. In particular, the implementations described herein allow a claims processing system to: assist users in documentation gathering; automatically analyze the content; and/or automatically determine a workflow to expedite the claims process. Additionally, the claims processing system may train ML models to classify input data and verify the classification of collected data at the user device level before uploading the data. By classifying and verifying data at the user device level, the system improves the document collection process by timely identifying documents of questionable quality and notifying the user about the documents. For instance, if the user is trying to upload a blurry image of car damage or an image of illegible repair estimates, giving the user timely notice to correct documentation may save the user additional trips to the shop. In additional examples, by classifying and verifying data at the user device level, the system may refrain from transmitting data for documents of questionable quality. Implementations of this disclosure can also conserve resources, such as processing resources, for example, by refraining from performing data analysis and/or transmitting data for review in when the data is incorrect or insufficient (e.g., in cases where the data is not matching what is needed to advance the claim). Additionally, refraining from transmitting claims data to servers reduces overall network usage. These techniques will be described in more detail below.

It should be appreciated that the subject matter presented herein can be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations can be performed in combination with other types of program components. Generally, program components include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program components can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 illustrates an example claims processing system 100 that includes a claims assistance component to receive input data and to process the data, e.g., to determine workflow.

The system 100 can include a service provider 102, which may be an insurance service provider, a claims handling service provider, or the like. The service provider 102 may provide the computing resources for the claims assistance platform, which may enable expedited claim processing, as described herein. FIG. 1 illustrates one or more remote servers 104 as computing resources associated with or accessible by the service provider 102. The remote server(s) 104 may include any number and combination of computing devices including but not limited to laptops, desktop computers, servers, and the like. The remote server(s) 104 can be accessed over an appropriate data communications network. Although FIG. 1 illustrates the remote server(s) 104, the service provider 102 may otherwise include or access other computing resources, including but not limited to local servers and/or cloud servers. In some examples, the service provider 102 can also include or access any number of devices, e.g., to scan physical documents, generate data, and/or transmit data to the remote server(s) 104.

The remote server(s) 104 can include a claims assistance component 106 to assist in claim processing. To provide a platform capable of automating portions of the claims process, the system needs to be able to analyze the content of documents from disparate sources in order to determine the workflow to advance the process. However, receiving documents from disparate sources often result in receiving unstructured data. The unstructured data includes information that is not stored in pre-defined data format or is not organized in a pre-defined manner. Additionally, the documents may be stored in non-standard file formats that a typical system is not designed to handle due to the sheer number of variables involved. For instance, the unstructured data may include image files of text-based documents (e.g., photos of medical bills, photos of repair estimates, etc.) instead of the standard document files for text-based documents. Additionally, different types of document data may require different methods to analyze the content in order to extract the relevant information for completing the claim. While a human user may easily discern a photo of a damaged vehicle from a photo of a hand-written estimate and analyze the content for each, the typical system is not "smart" or robust enough to handle the additional variables.

In some examples, the claims assistance component 106 may be configured to receive unstructured data from disparate sources (e.g., claims data sources 116) and determine the workflow based on the information extracted. The unstructured data could include different types of data files (e.g., a PDF file, Word document, a JPEG file, etc.). The unstructured data may include any documentation related to an insurance claim and may include vehicle damage photos, correspondence emails regarding the claim, accident scene videos, photos of bills, photos of repair estimates, insurance files, audio files, video files, and the like. As described herein, unstructured data may include information that is not stored in pre-defined data format or is not organized in a pre-defined manner. The unstructured data may be stored in any file format, including image file format, video file format, audio file format, text file format, program file format, or compressed file format. The unstructured data as received is in its native format, which may be different from a preferred file format based on the insurance categories. For instance, a repair estimate may be received in an image file format (e.g., JPG), which is the native format, but is not the preferred file format, which may include a text file format (e.g., PDF, DOC, TXT, etc.). As illustrated, the claims assistance component 106 can include a categorizing component 108 and a workflow component 110, which are described in turn.

The categorizing component 108 may process unstructured data and classify the data by insurance categories. In various examples, the categorizing component 108 may receive the document ("data" or "unstructured data") for a claimed incident (e.g., incident 114), generate a unique identifier for the unstructured data, and store an unprocessed version of the unstructured data according to a document retention policy. The categorizing component 108 may apply one or more document processing and/or machine learning models to perform information extraction on the unstructured data and generate corresponding metadata ("structured data" or "augmented data"). The metadata includes any information about the unstructured data. The one or more document processing and/or machine learning models may include data extraction models, image recognition models, transcription models, and the like. The metadata may be stored as a structured data file and may include all structured information extracted from the unstructured data and may be tagged with the unique identifier of the corresponding unstructured data.

The categorizing component 108 may classify a document into an insurance category to help determine the workflow from receiving the document. For instance, the categorizing component 108 may receive an image file from the policyholder's smartphone, but the image file could belong to a variety of insurance categories. Due to the higher availability of smartphones relative to scanners for a typical policyholder, the image file may be a photo of the damaged car or scene of the accident, or the image file may be an image capture of a medical bill or shop estimate. In this example, the categorizing component 108 may determine an analysis process to use to extract information and classify the image file by an insurance category.

In various examples, the categorizing component 108 may use one or more models to analyze and/or process a file. In some examples, the categorizing component 108 may apply an object recognition model to the image file. In additional and/or alternative examples, the categorizing component 108 may use optical character recognition (OCR) and/or natural language processing (NLP) for text recognition and information extraction for bills or images with text. In the present example, the categorizing component 108 may perform OCR and/or NLP to determine information in the medical bill (e.g., the cost, service provider, service rendered, etc.).

In some examples, the categorizing component 108 may classify the document by an insurance category and/or verify the insurance category is correct. In various examples, the categorizing component 108 may train and use one or more machine learning models to classify the document by an insurance category. In additional and/or alternative examples, the categorizing component 108 may receive the document via a user portal, email, and/or other electronic means that allows input for insurance category, and the categorizing component 108 may process the document to verify the insurance category. In some examples, the categorizing component 108 may use any combination of the image processing models and/or data analysis on image data to determine if an image is blurry. In various examples, if the user is trying to upload a blurry image of car damage or an image of illegible repair estimates, the categorizing component 108 may timely generate a notification for the user that object and/or text detection has failed and request a new image upload.

The workflow component 110 may determine a workflow in response to having received a document classified by the insurance category. In some examples, the workflow component 110 may determine additional information from the document could be extracted and may trigger advance analysis or request an agent to review the document. For instance, the categorizing component 108 may classify the document as a car accident photo, and the workflow component 110 may apply an advanced damage detection model associated with a car to the image. Additionally, and/or alternatively, the workflow component 110 may apply advanced image analysis to identify text (e.g., license plate number, street number, car model, etc.) in the photo. The workflow component 110 may augment the corresponding metadata with any additional information extracted by advance analysis, advance processing, and/or agent analysis. In some examples, the workflow component 110 may determine an image is too blurry to indicate the level of damage and generate a notification to request for a higher quality replacement image.

In various examples, the workflow component 110 may determine an event flow from the document. In various examples, the workflow component 110 may determine to trigger an event flow, including requests for actions outside the present system. The event flow may include generating notifications, triggering functions outside of the present system (e.g., triggering payment), generating requests for additional information, and the like. The workflow component 110 may determine one or more actors to notify based on the actor roles. For instance, if a new medical bill was received from a medical provider's office, the workflow component 110 may determine that the policyholder, the insurance agent, and/or an attorney may need to be notified.

The workflow component 110 may also generate prompts for a policyholder or another user to collect documents, evidence, and/or information about the incident. In some examples, the workflow component 110 may prompt the policyholder to contact the police for a police report. In additional examples, the workflow component 110 may prompt the policyholder to capture a set of photos to assist the agent in processing claim estimates. The workflow component 110 may provide prompts for a user to capture the images from different angles and/or a different view of the vehicle or scene of the accident.

The system 100 may include devices 112(1)-112(N) (individually and/or collectively referred to herein with devices 112), where N is any integer greater than and/or equal to 2. The devices 112 may be configured to generate data to be uploaded to and processed by one or more remote servers 104. The service provider 102 may be associated with a network of device(s) 112 and/or the remote server(s) 104 that may be communicatively coupled to the network in any manner, such as by a wired or wireless connection.

The devices 112 ("computing devices," or "user devices,") may include any number and combination of cameras, microphones, scanners, systems (e.g., global positioning systems, navigation systems), and the like, to capture sensor data. The devices 112 can be any type of computing device, including but not limited to a laptop, a desktop computer, a tablet computing device, a server computer, a smartphone, and the like. The device(s) 112 may include components that may be used to verify and/or compress data to be transported to the remote server(s) 104. The device(s) 112 may communicate with the remote server(s) 104 through any network.

In various examples, the devices 112 may be associated with any user, actor, or entity that is associated with a user account that may access the claims assistance platform to upload or download documentations associated with a claim. The user account may be assigned an actor role ("role") that grants document access based on the access policy assigned to that role. The actor roles may include but are not limited to policyholder, claimant, claim adjuster, attorney, other legal service providers, third-party vendors, agent, agent staff, service provider personnel, and the like. For instance, a device(s) 112 may be a smartphone with a camera that the user, who is the policyholder, has used to capture photos and/or videos related to the incident. The user may use the device(s) 112 to access the claims assistance platform to upload the photos and videos to the remote server(s) 104.

As a non-limiting example, the example incident 114 is used to illustrate the documentation flow for a claims process using the claims assistance component 106. In the present example, in response to the example incident 114, a user (e.g., policyholder, agent, etc.) may open a claim, and the claims assistance component 106 may generate an identifier for the claim ("A00-0123"). The different example sources 116 may submit (e.g., upload, mail, email, etc.) different claims documentations as example inputs 118 to the service provider 102. The categorizing component 108 may receive and store data 120 associated with the example inputs 118 as unstructured data with a unique file identifier and generate a corresponding example structured data 122. The categorizing component 108 may classify each claim documentation by an insurance category. It is to be appreciated that although the example insurance categories are spelled out here for illustrative purpose (e.g., "police report," "shop estimates," "medical bill," etc.), the insurance categories may be represented by any strings, identification number, and/or code. Additionally, although not depicted in the example, the workflow component 110 may also extract additional information from the example inputs 118 (e.g., police report number, estimate cost, medical bill cost, etc.) and write the additional information to the example structured data 122.

A first example source 116(1) may include a police officer who wrote a hand-written police report as a first example input 118(1). The first example input 118(1) may be a scanned version of the police report, data pulled from the public records portal, or other data about the incident 114 and associated with the first example source 116(1). As illustrated, the first example input 118(1) may be collected as, or otherwise converted into, data 120. The categorizing component 108 may store the unstructured data associated with the first example input 118(1) with a unique file identifier (e.g., "C0123-0001") and generate a corresponding first example structured data 122(1). As also shown in FIG. 1, the categorizing component 108 may classify the input by insurance category (e.g., "police report") and add the information to the first example structured data 122(1).

A second example source 116(2) may include an auto shop mechanic who wrote a repair estimate as a second example input 118(2). The second example input 118(2) may be a faxed copy of the repair estimate, a mailed copy of the estimate that is scanned in, or other data about the incident 114 and associated with the second example source 116(2). As illustrated, the second example input 118(2) may be collected as, or otherwise converted into, data 120. The categorizing component 108 may store the unstructured data associated with the second example input 118(2) with a unique file identifier (e.g., "C0123-0002") and generate a corresponding second example structured data 122(2). As also shown in FIG. 1, the categorizing component 108 may classify the input by insurance category (e.g., "shop estimates") and add the information to the second example structured data 122(2).

A third example source 116(3) may include a doctor who treated an injured party and created a medical bill as a third example input 118(3). The third example input 118(3) may be a medical bill, data pulled from patient's health records, or other data about the incident 114 and associated with the third example source 116(3), submitted through a desktop computer, the first example device 112(1). As illustrated, the third example input 118(3) may be collected as, or otherwise converted into, data 120. The categorizing component 108 may store the unstructured data associated with the third example input 118(3) with a unique file identifier (e.g., "C0123-0003") and generate a corresponding third example structured data 122(3). As also shown in FIG. 1, the categorizing component 108 may classify the input by insurance category (e.g., "medical bill") and add the information to the third example structured data 122(3).

A fourth example source 116(4) may include a policyholder who took vehicle damage photos from her phone as the fourth example input 118(4). The fourth example input 118(4) may be a photo or collection of photos, or other data about the incident 114 and associated with the fourth example source 116(4), submitted through a cellphone, the second example device 112(2). As illustrated, the fourth example input 118(4) may be collected as, or otherwise converted into, data 120. The categorizing component 108 may store the unstructured data associated with the fourth example input 118(4) with a unique file identifier (e.g., "C0123-0004") and generate a corresponding fourth example structured data 122(4). As also shown in FIG. 1, the categorizing component 108 may classify the input by insurance category (e.g., "damage photo") and add the information to the fourth example structured data 122(4).

A fifth example source 116(N) may include the policyholder who took videos from her dashcam as a fifth example input 118(N). The fifth example input 118(N) may be a video or series of videos, or other data about the incident 114 and associated with the fifth example source 116(N), submitted through a laptop, the third example device 112(N), from her home after she uploaded the video to her laptop. As illustrated, the fifth example input 118(N) may be collected as, or otherwise converted into, data 120. The categorizing component 108 may store the unstructured data associated with the fifth example input 118(N) with a unique file identifier (e.g., "C0123-0005") and generate a corresponding fifth example structured data 122(N). As also shown in FIG. 1, the categorizing component 108 may classify the input by insurance category (e.g., "accident video") and add the information to the fifth example structured data 122(N).

In the present non-limiting example, the workflow component 110 may receive the different example inputs 118 at different points in time. In response to receiving and tagging each data, the workflow component 110 may determine whether to notify one or more users about the documentation and/or about a follow-up action to take. For instance, the workflow component 110 may determine after receiving the police report that the policyholder should submit any photo evidence she has and send her a prompt to capture and/or upload photos. In this example, the workflow component 110 may determine that all the information required to process the claims is complete and may determine to send the example notification 124 to the agent and/or the policyholder about the complete documentation. The example notification 124 may also notify the agent to review and finalize the claim.

Figure 2:
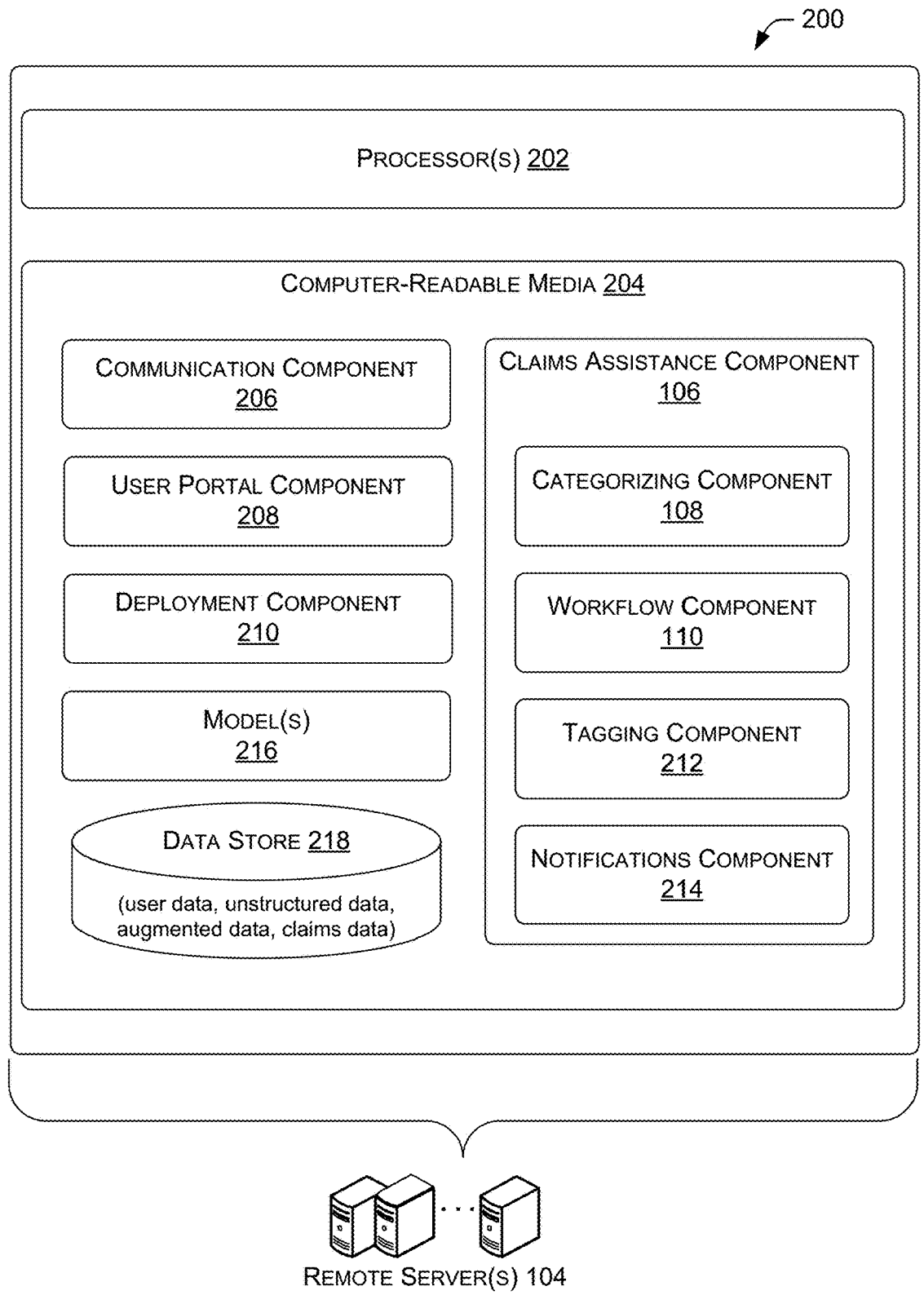
FIG. 2 is a block diagram of an illustrative computing architecture of the remote servers shown in FIG. 1.
Figure 3:
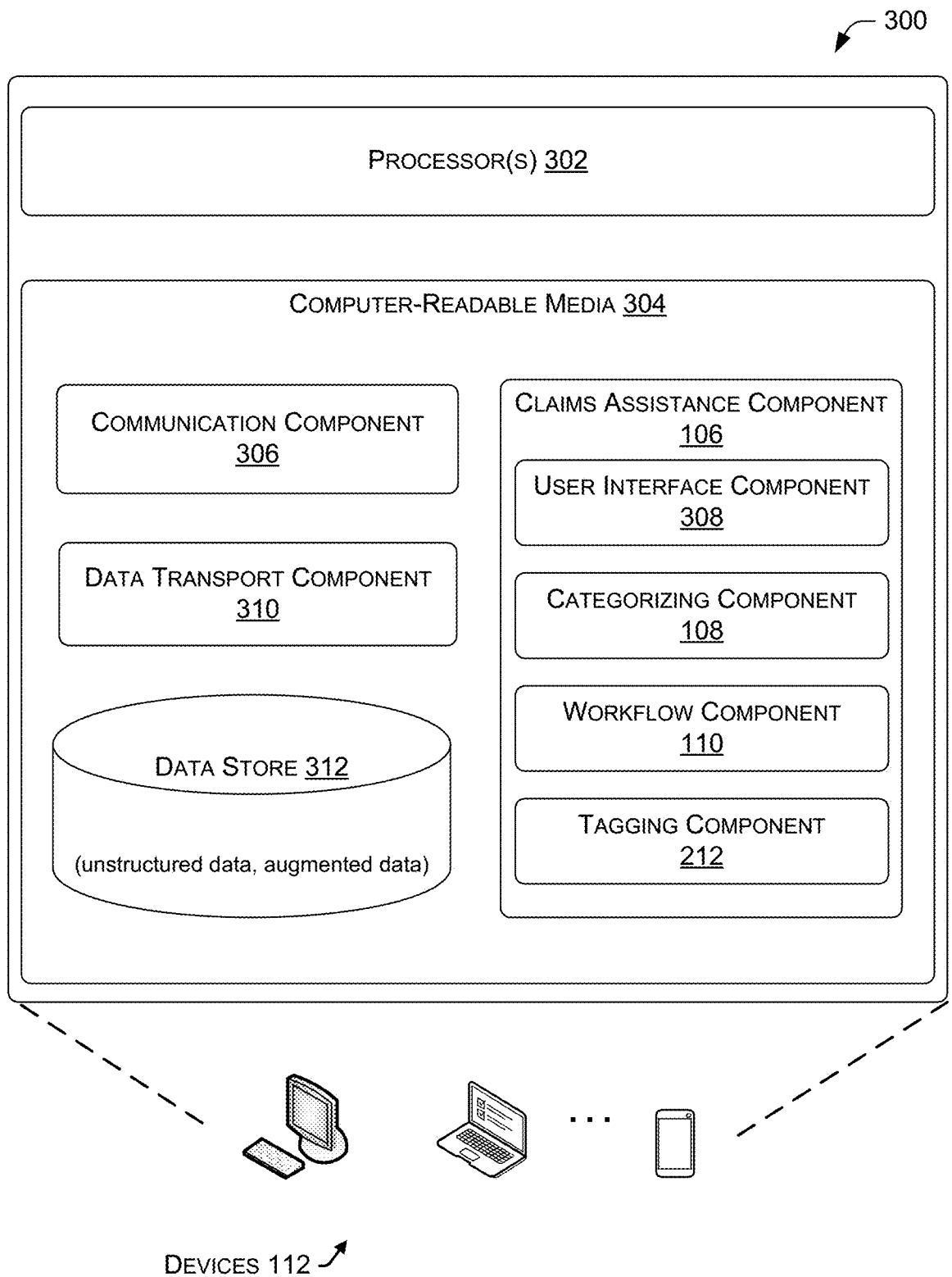
FIG. 3 is a block diagram of an illustrative computing architecture of the devices shown in FIG. 1.

FIG. 2 and FIG. 3 are block diagrams of an illustrative computing architecture 200 of the remote server(s) 104 and an illustrative computing architecture 300 of the device(s) 112, respectively. The computing architecture 200 and computing architecture 300 may each be implemented in a distributed or non-distributed computing environment.

The computing architecture 200 and computing architecture 300 may include one or more processors 202 and 302, and one or more computer-readable media 204 and 304 that stores various components, applications, programs, or other data. The computer-readable media 204 and 304 may include instructions that, when executed by the one or more processors 202 and 302, respectively, cause the processors to perform the operations described herein for the system 100.

The computer-readable media 204 and 304 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some examples the computer-readable media 204 and 304 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

As shown in FIG. 2, in some configurations, the computer-readable media 204 may store a communication component 206, a user portal component 208, a deployment component 210, the claims assistance component 106 and associated components, model(s) 216, and a data store 218, which are described in turn. The components may be stored together or in a distributed arrangement.

The communication component 206 can include functionality to conduct communications with one or more other devices, as discussed herein. For instance, the communication component can be configured to receive the data 120, representative of the inputs 118. In some instances, the communication component 206 can conduct communication via a network.

The user portal component 208 may allow a user or an entity to register a user account to request access to claims documentation. The user portal component 208 may manage and keep track of the actor role associated with each user account. As described herein, the roles may include but are not limited to policyholder, claimant, claim adjuster, attorney, other legal service providers, third-party vendors, agent, agent staff, service provider personnel, and the like. The role may determine the level of access to certain documents related to the claims. For instance, a car rental bill for the policyholder may be viewable for an agent and the policyholder, but not the claimant's attorneys because a car rental bill for the policyholder is not relevant to the claimant's settlement. In some examples, the user portal component 208 may receive and store preferred method of communications (e.g., email, text messages, automated phone call, application push notification, etc.) for the registered users and use the preferred method of communications to notify the user of relevant documentation received.

The user portal component 208 may manage user authorizations. For instance, certain users/actors may be authorized to access data related only to specific claims. In various examples, the user portal component 208 may generate a user interface for the user to access the claims assistance component 106. For instance, the user portal component 208 may provide access to view stored documents or descriptions of the documents through a user interface as an application, as described herein with respect to FIG. 4. In some examples, the user portal component 208 may include a subscriber/publisher system, wherein a user account designated by an actor role may automatically subscribe to publications of documents categorized by certain insurance categories, by claim identify, and/or by completion. For instance, a policyholder may subscribe to publications of any new documentation uploaded by another user, or an attorney may subscribe to publications of medical bills but not rental car bills. Additionally, an agent may subscribe to publications of complete or near-complete documentations.

In some examples, the user portal component 208 may receive and store preferred method(s) of communications for each user account, e.g., to notify the user(s) of new documentation received. In various examples, the user(s) may also select a notification frequency through the user portal component 208.

The deployment component 210 may interact with the user portal component 208, e.g., to transmit the latest claims assistance and trained models to the devices 112. The deployment component 210 may deploy a latest version of a trained machine learning (ML) model(s) 216 to enable devices 112 to perform data verification to filter out incorrect data or to compress and/or handle data transfer for large files. The devices 112 running the trained models 216 may also classify the data by categories and determine a confidence level for the classification. If the confidence level fails to meet a threshold, the user may be asked to verify the category, and that data may be transmitted as retraining data. In some examples, the deployment component 210 may determine one or more data compression algorithm to transmit to the device(s) 112 to ensure that the remote server(s) 104 would have the correct decompression algorithm. In additional examples, the deployment component 210 may transmit encryption keys to the device(s) 112 to ensure that the remote server(s) 104 would have the correct decryption keys.

The claims assistance component 106 may include the categorizing component 108, the workflow component 110, a tagging component 212, and a notifications component 214. In some examples, the claims assistance component 106 and associated components may receive unstructured data from a source and store a copy of the unstructured data in its native format before processing or otherwise editing the data. In particular, because the unstructured data could include documents to be used as evidence in court, the claims assistance component 106 may determine to preserve a copy of the unmodified unstructured data. Additionally, when a document is requested by a legal party, the claims assistance component 106 may determine to retrieve the unmodified unstructured data. The claims assistance component 106 and associated components may process the unstructured data to extract information, store the exacted information in a searchable structured data format, and determine the workflow based on the information extracted.

The categorizing component 108 may classify the unstructured data into insurance categories. As described herein with respect to FIG. 1, the categorizing component 108 may process unstructured data and classify the data by insurance categories. In various examples, the categorizing component 108 may receive unstructured data for a claimed incident, generate a unique identifier for the unstructured data, and store an unprocessed version of the unstructured data according to a document retention policy. The categorizing component 108 may apply one or more document processing and/or machine learning models to perform information extraction on the unstructured data to generate corresponding metadata. The one or more document processing and/or machine learning models may include data extraction models, image recognition models, transcription models, and the like. The metadata may be stored as a structured data file and may include all structured information extracted from the document and is tagged with the unique identifier of the corresponding unstructured data In some examples, the categorizing component 108 may determine insurance categories based on policy and/or claim type. Initially, the categorizing component 108 may identify the insurance policy type (e.g., home insurance, car insurance, renter's insurance, etc.) and the incident type (e.g., flood, fire, burglary, hit-and-run, single-car accident, rear-end collision, side-impact collision, head-on collision, etc.) for the claimed incident. The categorizing component 108 may identify a list of insurance categories for documentations based on the policy and incident type. For instance, a head-on collision may require more documentation than a simple single-car accident, and the list of insurance categories may include: police reports, vehicle damage photos for each vehicle damaged, scene of incident videos, medical bills, repair estimates, and the like. The categorizing component 108 may classify the unstructured data to an insurance category from the list of insurance categories.

In some examples, the categorizing component 108 and/or the workflow component 110 may train and use one or more models to analyze input data. The one or more models may be included in the model(s) 216, as will be described herein. The categorizing component 108 may train a model to perform classification on input data (e.g., unstructured data). As described herein, a trained model can comprise a classifier that is tasked with classifying unknown data (e.g., an unknown image) as one of a class label from multiple insurance categories (e.g., labeling the image as an estimate, a bill, or a car). The unknown data may include an image(s), a video(s), multimedia, etc. The categorizing component 108 and the workflow component 110 may create training data for machine learning models from claims data from previously settled cases and may include any combination of models to parse data files to extract information. Thus, the model(s) may be configured with text recognition, natural language processing, image recognition, speech recognition, and other functionality to process unknown data with various types of content. The model(s) may also determine an associated confidence score for the classification, where a low confidence score defined by a confidence score below a threshold indicates a low likelihood that the class label (e.g., insurance category) is correct for the data. The model may "learn" any new and/or different insurance categories and/or workflows based on continuous training and retraining machine learning models with additional data received from additional settled claims. For instance, the present system may use data from previously settled claims to train models to classify documents and determine workflow. As new claims are settled, the data from the new settled claims may be fed back into the system to retrain the models. The data from the new settled claims may include retraining data labeled by an analyst to help refine the models, including adding new insurance categories, changing insurance categories, adding new workflows, changing workflows, changing tagged information, and the like.

In various examples, the categorizing component 108 and/or the workflow component 110 may receive unstructured data and determine a parsing method to extract the information contained in the data. In some examples, the categorizing component 108 and/or the workflow component 110 may determine to reformat the unstructured data into a preferred file format based on the insurance categories. For instance, categorizing component 108 and/or the workflow component 110 may receive an image file (e.g., JPEG) from the policyholder's smartphone but the image file could belong to a variety of insurance categories. Due to the higher availability of smartphones over scanners for a typical policyholder, the image file may be a photo of the damaged car or scene of the accident, or the image file may be an image capture of a police report, medical bill, or shop estimate. In some examples, the categorizing component 108 and/or the workflow component 110 may reformat files with text-based categories (e.g., bills, estimates, etc.) into a standard file format for text-based documents (e.g., .PDF, .txt, .doc), thus converting the unstructured data into searchable text. In examples, the categorizing component 108 and/or the workflow component 110 may use image recognition models to determine the damage severity of the car, transcription models convert audio files into searchable speech text files, and optical character recognition (OCR) and/or natural language processing (NLP) models for text recognition and information extraction for medical bill information. In the present example, categorizing component 108 and/or the workflow component 110 may perform OCR and/or NLP to determine relevant information in the medical bill (e.g., the cost, service provider, service rendered, etc.). In various examples, the categorizing component 108 and/or the workflow component 110 may use a transcription model to extract speech from audio or video files and generate a corresponding searchable text file.

In additional examples, the categorizing component 108 and/or the workflow component 110 may train and use one or more models to classify input data to determine if a vehicle should be escalated as a total claim loss. As described herein, a trained model can classify the severity level of a claim and determine an estimated settlement amount. Accordingly, the trained model may also be able to determine if the cost to repair a vehicle is more than the actual value of the vehicle. By providing timely notification that a vehicle is classified as total loss, the user may be saved the trouble of towing or moving a car to a shop for estimates.

In various examples, the categorizing component 108 and/or the workflow component 110 may train and use one or more models to classify image data to find and identify objects depicted in the image. For instance, a claimant and/or policyholder may provide a list of items, including a "Brand X" child safety seat, that was lost or damaged as a result of a reported incident. In the present example, the model may determine a "Brand X" child safety seat was depicted in an image data; and the system may determine that the correct documentation for the "Brand X" child safety seat has been provided and may automatically add the allowable payout amount for the "Brand X" child safety seat. Alternatively, if the model determines that the image data identifies only a "Brand Z" child safety seat and not a "Brand X" child safety seat, the system may determine that the correct documentation for the "Brand X" child safety seat has not been provided and may request additional documentation or request a review of the list of items.

The workflow component 110 may determine a workflow and/or an event flow in response to receiving a document. As described herein with respect to FIG. 1, the workflow component 110 may determine a workflow in response to having received a document classified by the insurance category. In some examples, the workflow component 110 may determine additional information from this document could be extracted and may trigger advance analysis or request an agent to review the document. For instance, the categorizing component 108 may classify the document as a car accident photo, and the workflow component 110 may apply an advanced damage detection model associated with a car to the image. The workflow component 110 may augment the corresponding structured data file with any additional information extracted by advance analysis, advance processing, and/or agent analysis. In various examples, the workflow component 110 may determine a workflow in response to having received a document classified by the insurance category. As described herein, based on the policy and incident type, the categorizing component 108 may identify a list of insurance categories for documentations. Using this list, the workflow component 110 may generate a checklist for required documentations to settle the present claim and log the documentations on the checklist as individual documentations is received. Once the required documentation checklist is complete, the workflow component 110 may notify an agent to review and settle the claim. In some examples, the agent may add additional steps needed to settle the claim, and the workflow component 110 may log the additional steps for future workflow algorithm training.

In various examples, the workflow component 110 may determine an event flow from the document. In various examples, the workflow component 110 may determine to trigger an event flow, including actions outside the present system. The event flow may include generating notifications, triggering functions outside of the present system (e.g., triggering payment), generating requests for additional information, and the like. The workflow component 110 may determine one or more actors to notify based on the actor roles. For instance, if a new medical bill was received from a medical provider's office, the workflow component 110 may determine that the policyholder, the insurance agent, and/or an attorney may need to be notified. The workflow component 110 may determine that the current event flow includes generating notification to request a user to collect evidence or information about the incident.

The workflow component 110 may also generate and present prompts, via a user interface, for a policyholder or another user to collect documents, evidence, and/or information about the incident. In some examples, the workflow component 110 may prompt the policyholder to contact the police to take a police report if the policyholder creates a new claim report. In additional examples, the workflow component 110 may prompt the policyholder to capture a set of photos to assist the agent in processing claim estimates. The workflow component 110 may provide prompts for a user to capture the images from different angles and/or a different view of the vehicle or scene of the accident. In some examples, after receiving a set of vehicle damage photos, the workflow component 110 may perform advance analysis to determine if the damage to the vehicle indicates total loss ("totaled"). In the present example, if the photos indicate a total loss and a repair estimate from a repair shop has not been logged yet, the workflow component 110 may determine that the policyholder does not need to take the vehicle into a shop for an estimate and notify an agent to verify the total loss and/or trigger an event flow for payment.

In some examples, the present system may include a subscriber/publisher system, and the workflow component 110 may determine to publish notifications for the new documents. In additional examples, the workflow component 110 may determine that the actor role of the user to be notified is an agent and/or user assigned to handle the claim and may generate a work task (e.g., review new document, review all documents to settle a claim, etc.) and assign the task to the user. In various examples, if the task includes functions outside of the present claims assistance system, the workflow component 110 may trigger an event flow.

The tagging component 212 may write any metadata associated with the unstructured data to corresponding structured data. The metadata may include any information generated for and/or information extracted about the unstructured data. The tagging component 212 may tag and store the unstructured data and the corresponding structured data for the system to retrieve one or both files as requested. The tagging component 212 may write metadata in the corresponding structured data in a format that allows the system to search the content in the metadata. The metadata may include an associated file identifier, the insurance category, the claim identifier, the incident type, and/or any additional information extracted from the data file that is relevant to settling the claim (e.g., billed amount, estimate amount, etc.). The metadata may include persistent data, including but not limited to, time received, time captured, and description for the data. The tagging component 212 may write the metadata in the structured data to allow an agent to quickly search, identify, and/or review the information relevant to settling the claim. In some examples, the tagging component 212 may also tag the file with access permission based on the actor role. In additional examples, the tagging component 212 may tag the file with a simple description such that even if a user with an actor role is restricted from viewing a particular file, the user may still be able to view the simple description.

The notification component 214 may generate notifications for documents received. In various examples, the notification component 214 may interact with the workflow component 110 to determine when a notification should be generated and published. The notification component 214 may publish the notification to a user account based on its associated actor role as described herein. In some examples, the notification component 214 may determine the preferred communication method and/or notification frequency and send the notification accordingly. In some examples, the notification component 214 may track the notifications it has sent out and track any document accessed and provide the tracking list to an agent or an analyst for review. This tracking list may be limited to data that is labeled sensitive to avoid accidental distribution of sensitive data.

In various examples, the present system may train one or more machine learning (ML) model(s) 216 using labeled data as training data. In some examples, initial training data may include samples of data from settled insurance claims containing documents and data associated with the claims. In additional and/or alternative examples, the data may be manually classified, reclassified, and/or created by labeling (or tagging) samples of data with various insurance categories and information. The labels applied to the samples of data may indicate different insurance policy types and may indicate insurance categories based on the policy types. For example, a first data object may include image data of a medical bill for a car insurance policy. In a second example, a second data object may include image data of a water-damaged wall for a homeowner's insurance policy.

In some examples, the training data may also be labeled with severity such as "severity level 1," "high severity," or a score, value, code, the payout amount, or identifier that indicates the severity level of the claim. In general, the different types of data with which the samples of data can be labeled may span a spectrum of severity. In some configurations, heuristics and similar mechanisms may be used to infer labels for the samples of data in the claims assistance component 106 to determine an estimated settlement amount and/or automatically process the claim as a total loss. For instance, regression models may use a corpus of severity data for image data with different levels of car damage and then label samples of data with the settlement amount and whether it was a total loss.

Other techniques, such as object recognition, transcription, optical character recognition (OCR), natural language processing (NLP) and/or any other information extraction algorithms, may be used to automatically extract relevant information.

Machine learning generally involves processing a set of examples (called "training data") in order to train one or more machine learning models 216. The model(s) 216, once trained, is a learned mechanism that can receive new data as input and estimate or predict a result as output. For example, a trained model(s) 216 can comprise a classifier that is tasked with classifying unknown input (e.g., an unknown image) as one of multiple class labels by insurance categories (e.g., labeling the image as a medical bill or damaged vehicle). In additional examples, the model(s) 216 can be retrained with additional and/or new training data labeled with one or more new insurance categories to teach the model(s) 216 to classify unknown input by insurance categories that may now include the one or more new insurance categories. In the context of the present disclosure, the unknown input may include, inter alia, data that is to be handled according to its level of severity, and the trained machine learning model(s) 216 may be tasked with classifying the unknown input (a subject for classification) as one of the multiple class labels. The unknown data may include an image(s), a video(s), document(s) multimedia, etc. Thus, the trained machine learning model(s) 216 may be configured with text recognition, image recognition, and other functionality to process unknown data with various types of content. The class labels, in this case, may correspond to a classification of the unknown data as a type of data among multiple different types of data corresponding to insurance categories.

In various examples, if the trained model(s) 216 has low confidence (e.g., a confidence score is below a threshold) in its ability to correctly label the insurance category for image data, this low confidence may trigger a notification for an agent or analyst to review the data with respect to its classification to the insurance category. After the data has been reviewed and/or the data is correctly labeled with an insurance category, the data may be used as additional training data to retrain the model(s) 216. Thus, the system may retrain the model(s) 216 with the additional training data to generate the new model(s) 216. The new model(s) 216 may be transmitted to the devices 112 in a continuous retraining cycle to improve the classifier.

The machine learning model(s) 216 may represent a single model or an ensemble of base-level machine learning models and may be implemented as any type of model(s) 216. For example, suitable machine learning model(s) 216 for use with the techniques and systems described herein include, without limitation, tree-based models, k-Nearest Neighbors (kNN), support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of model(s) 216 whose outputs (classifications) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

As mentioned, the output of the machine learning model(s) 216—which processes unknown data as a subject for classification—may include, inter alia, a classification of the unknown data as a type of data among different types of data corresponding to different levels of severity. The output may include additional information as well, such as a description of the data object that includes identifying any objects in an image (e.g., car, stop sign, street light, safety seats, etc.), a cost of a bill, a value of an estimate, and the like.

The data store 218 may store at least some data including, but not limited to, data collected from the user portal component 208, the deployment component 210, the claims assistance component 106, and the model(s) 216, including data associated with user data, input data, augmented data, and claims data. In some examples, the data may be automatically added via a computing device (e.g., device(s) 112, remote server(s) 104). User data may correspond to one or more user or entity requesting documentation access from the service provider 102. In various examples, user data may include information associated with the user such as the name, contact information, the actor role, etc. Unstructured data may correspond to data received without additional formatting or information tagged. In some examples, when the documentation is requested by a specific actor role (e.g., lawyer), the unstructured data may be retrieved if there is a need to preserve original evidence. Augmented data and/or structured data may correspond to unstructured data that has been tagged with additional information in the metadata and/or may correspond to data that has been reformatted. Claims data may include data used by the system to augment the raw data and/or any other system-generated data for claims processing. In additional or alternative examples, at least some of the data may be stored in a storage system or other data repository.

As shown in FIG. 3, in some configurations, the computer-readable media 304 may store a communication component 306, the claims assistance component 106 and associated components, a data transport component 310, and a data store 312, which are described in turn. The components may be stored together or in a distributed arrangement.

The communication component 306 can include functionality to conduct communications with one or more other devices, as discussed herein. In some instances, the communication component 306 can conduct communication via a network. In some instances, the communication component 306 can determine the resources of the device 300 to conduct the communication. In response to determining that the device is using a slow or paid data service (e.g., cellular data), the communication component 306 may determine to wait or compress data transfer for the claims assistance component 106. In various examples, the communication component 306 can request user preference on whether the device should allow the use of cellular data for transmitting large data files.

The claims assistance component 106 may include a user interface component 308, the categorizing component 108, the tagging component 212, and the workflow component 110. The claims assistance component 106 may perform tasks related to data gathering, filtering, and transporting to and from the remote server(s) 104. Additionally, the claims assistance component 106 may interact with the remote server(s) 104 to receive the latest model(s) or updates to one or more components of the claims assistance component 106. In some examples, the claims assistance component 106 may be configured to execute in response to determining Wi-Fi signal or another fast Internet connection is available. For instance, the data transport component 310 running on the present device 112 may determine that a particular video file requires high bandwidth to transfer and should be queued up for uploading at a later time when a faster connection is available, thus transfer for a particular video file may be triggered at a later time.

The user interface component 308 may present an interface to provide access to add and/or review claims documentations based on permission granted to the role of the user account. In various examples, the user interface component 308 may generate and present the example visualization to upload, view, and follow the progress of claims documentation through the user interface, as described herein with respect to FIG. 4. The roles may include policyholder, claimant, claim adjuster, attorney, other legal service providers, third-party vendors, agent, agent staff, service provider personnel, and the like. In some examples, the user interface component 308 may provide a prompt for documentations to be uploaded and prompt the user to select a documentation category from a drop-down list. In additional and/or alternative examples, the claims assistance component 106 may perform document verification, and if it determines that the documentation does not correlate with the user-selected documentation category, the user interface component 308 may provide a prompt to ask the user to verify the data to be uploaded. For instance, if the user selected to add a repair estimate and is uploading a photo of a hand-written estimate, the claims assistance component 106 may determine the hand-writing is not legible and prompt the user to verify the data and/or provide a better copy of the estimate. It is to be appreciated that by requesting a better or more legible copy of the documentation, the claims assistance component 106 is attempting to save the user from having to make multiple trips to request documents.

In various examples, the user interface component 308 may present an interface to view stored documentation or the progress of the claim. The user interface component 308 may include a media player to stream videos that the user account has permission to view. In some examples, the user interface component 308 may provide the current progress of the claims processing.

The categorizing component 108 may receive and use one or more models to perform classification on data the user is trying to upload. As described herein, a trained model can comprise a classifier that is tasked with classifying unknown data (e.g., an unknown image) as one of a class label from multiple insurance categories (e.g., labeling the image as an estimate, a bill, or a car). The unknown data may include one or more image(s), video(s), multimedia, or the like. The model(s) may be received from the remote server(s) 104. Thus, the model(s) may be configured with text recognition, image recognition, and other functionality to process unknown data with various types of content. The model may also determine an associated confidence score for the classification, where a lower confidence score indicates a lower likelihood that the class label is correct for the data. The categorizing component 108 may determine that the confidence level doesn't met a threshold and the user should be prompted to check the uploaded data. The categorizing component 108 may determine to upload data with a confidence score that meets or satisfy a threshold.

The categorizing component 108 may use one or more models or algorithm to determine the system's priority to upload the data by determining a severity score or level for the data. A higher severity score or level indicates a higher priority in having the data uploaded to the remote server(s) 104. In some examples, the categorizing component 108 may batch certain sets of data generated by different sensors at the same time period from the same device to be sent to the remote server(s) 104.

The tagging component 212 may tag the data, as described herein with respect to FIG. 2. The tagging component 212 may tag the data with user input data, including the user's input on a selection of insurance category, a selection of severity of the claim, time the video was recorded, time a photo was captured, billed amount, estimate amount, and the like. The tagging component 212 may tag both the machine extracted information and the user input data for verification and/or machine learning training purposes.

The workflow component 110 may determine an event flow in response to having received a document classified by the insurance category, as described herein with respect to FIGS. 1 and 2. In various examples, the workflow component 110 may determine the event flow independently based on local data process without receiving additional instructions from the remote server(s) 104. For instance, the workflow component 110 may generate prompts for a user to capture a set of photos to assist an appraiser in performing claim estimates. In the present example, the workflow component 110 may prompt the user to capture an image from a specific angle or view away from the vehicle and may prompt the user to consider recapturing images that may be blurry or determined to be incorrect.

The data transport component 310 may determine when to upload the claims data based on the methods available to the device(s) 112. The data transport component 310 may determine to upload the data to the remote server(s) 104 without delay based on the data being classified as the highest severity level. In some examples, if the data is classified as the highest severity level, the data transport component 310 may first generate a highly compressed version of the data to upload a version of this data to the review queue and/or remote server(s) 104 as quickly as possible. If the current device 112 is incapable of performing the data transmission to the remote server(s) 104 (e.g., due to lack of wide-area network connectivity), the data transport component 310 may transfer the data to a local uploading device to complete the data transfer.

In some examples, if the data is classified as less than the highest severity but not the lowest level of severity, the data transport component 310 may place the data in a data transfer queue for delayed transmission. The data transport component 310 running in the background may slowly feed data from the queue, or it may wait to initiate data transfer based on detecting a fast network connection. In various examples, at the lowest level of severity, the data transport component 310 may determine to store the data until a fast network connection (e.g., Wi-Fi) is detected.

The data store 312 may store at least some data including, but not limited to, data collected from the user interface component 308, the categorizing component 108, the tagging component 212, the workflow component 110, and the data transport component 310, including data associated with claims data, user data, sensor data, and device specification data. In some examples, the data may be automatically added via a computing device (e.g., remote server(s) 104), including user data, actor role, and claims handling data may correspond to one or more device(s) 112 associated with a user registered with the service provider 102. In various examples, user data may include information associated with a registered user such as the name, preferred method of communication, notification frequency, actor role, etc. The unstructured data may include the raw data as captured by sensors or scanners. The augmented data may include the input data tagged with metadata containing additional information. In additional or alternative examples, at least some of the data may be stored in a storage system or other data repository.

Figure 4:
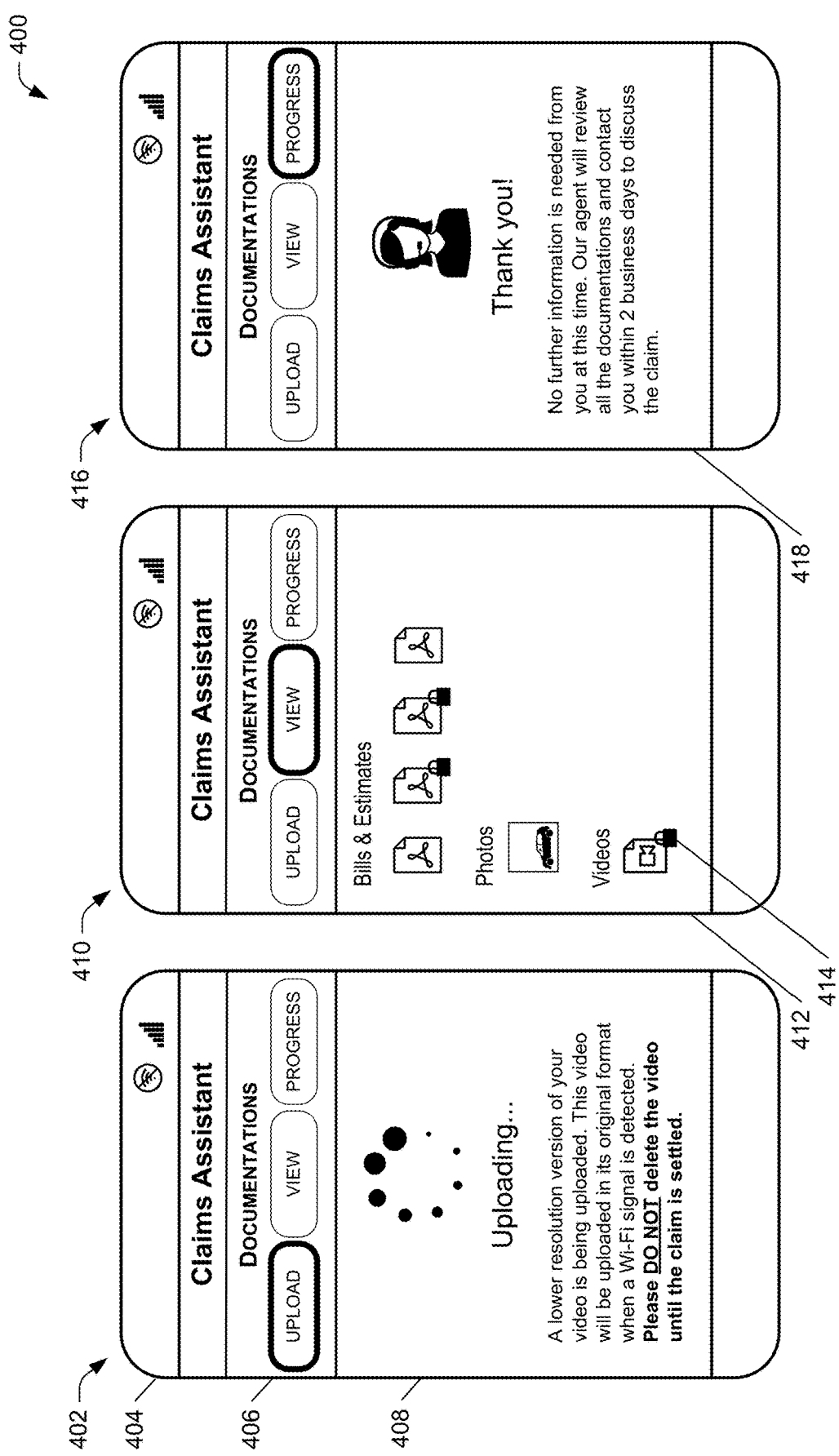
FIG. 4 illustrates example user interfaces of a device implementing the claims assistance component, as discussed herein.

FIG. 4 illustrates example user interfaces (UI) 400 of a device implementing the claims assistance component, as discussed herein. In some instances, the example UI 400 can represent the claims assistance component 106 as example visualizations, including an example document upload visualization 402, an example document viewer visualization 410, and an example claims progress visualization 416.

In a non-limiting example, the example document upload visualization 402 may include an example connection status 404, an example documentation action 406, and an example upload UI 408. The example connection status 404 is showing a lack of Wi-Fi connectivity but there is strong cellular signal. The example documentation action 406 indicates the current documentation action as selected by the user is "UPLOAD." In some examples, the example upload UI 408 may present a drop-down menu listing documents that the user could upload and a navigation option to select the file to upload. In the present example, the user may be trying to upload a large video file from a smartphone. In response to the lack of Wi-Fi connectivity, the example uploading instruction 408 may provide instructions for the user to not delete the video file and attempt to upload a compressed version of the video until that video could be transmitted. In some examples, the claims assistance component 106 can also automatically mark the video file as "Read Only" or move the file to a secure folder to avoid accidental deletion of the video file and/or any additional evidence-related files the user is trying to upload.

The example document viewer visualization 410 may include an example document view UI 412 and an example locked access 414. The example document view UI 412 may present any documents uploaded for the current claim. The example document viewer visualization 410 may present the documents as organized by categories, by date received, or by any other organization scheme. The example locked access 414 may indicate to the user that permission to view the document is currently locked, but the file is in the database. This locked access may be based on lack of permission, based on the actor role of the user, based on the file being under-review, or based on the file being incomplete in transfer. In some examples, instead of rendering the document icons with locked access, the icons may simply not appear for some actor roles without any access to check on these documents. For instance, a policyholder might not need to be able to view every file available (e.g., an itemized medical billing for the claimant) but may be able to view the icons with a general description to determine the completeness of documentation for the claim.

The example claims progress visualization 416 may include an example progress UI 418. The example progress UI 418 may display any information regarding the current status of the claim and/or documentation still missing from the claims file. For instance, if the policyholder was the liable party in a vehicle accident and the claimant is still receiving medical treatment, the claims assistance component 106 may determine that there isn't any additional documentation needed from the policyholder at this point. In the present example, the claims assistance component 106 may determine that documentation gathering for the present claim is complete, thus the example progress UI 418 may notify the user that no further documentation is requested from the user to complete the claim and that an agent will review the claim and contact the user.

Figure 5:
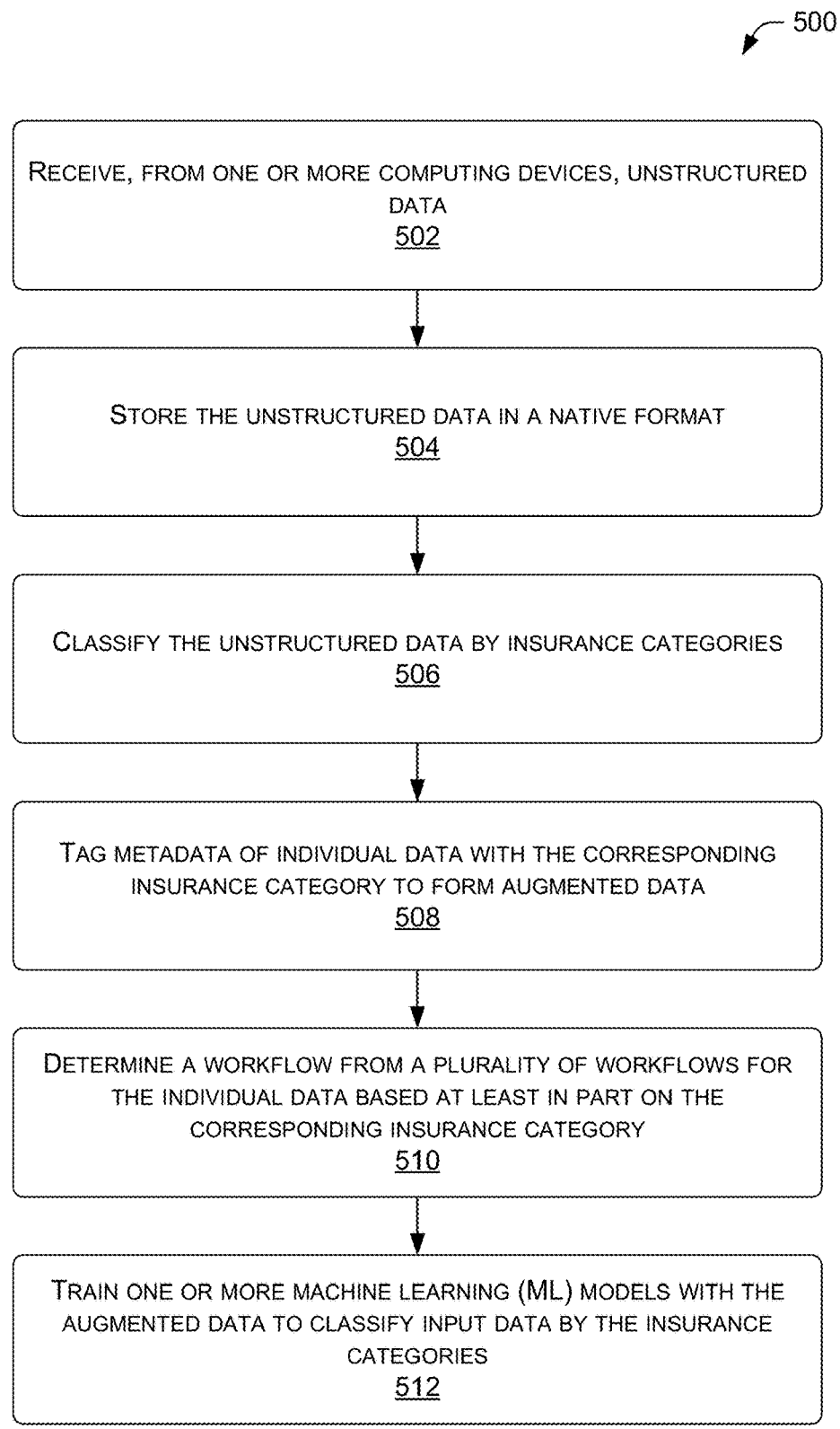
FIG. 5 illustrates an example process for receiving and classifying data and training machine learning models to classify data, as discussed herein.
Figure 6:
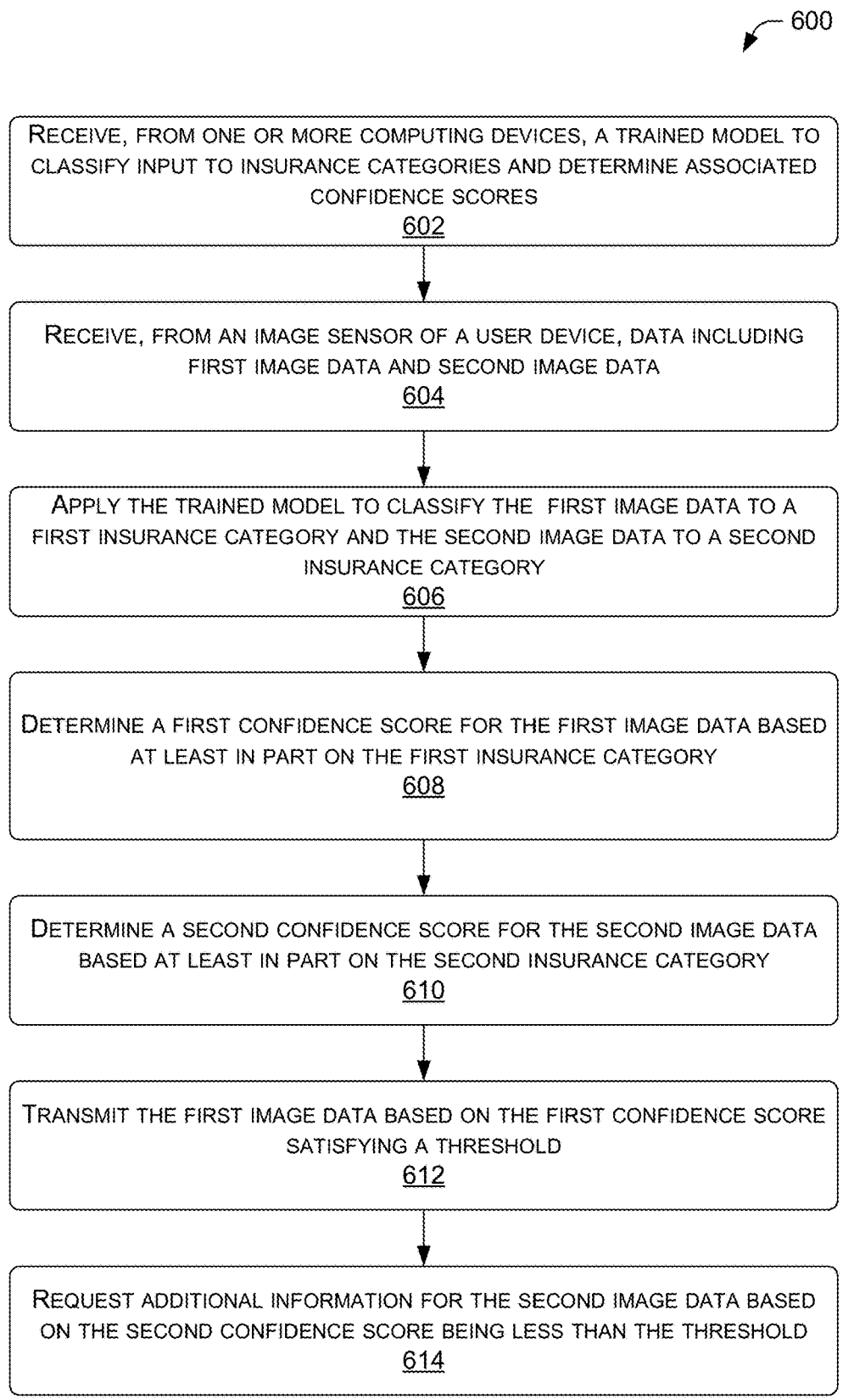
FIG. 6 illustrates an example process for using a trained model to classify data and determine associated confidence scores, as discussed herein.
Figure 7:
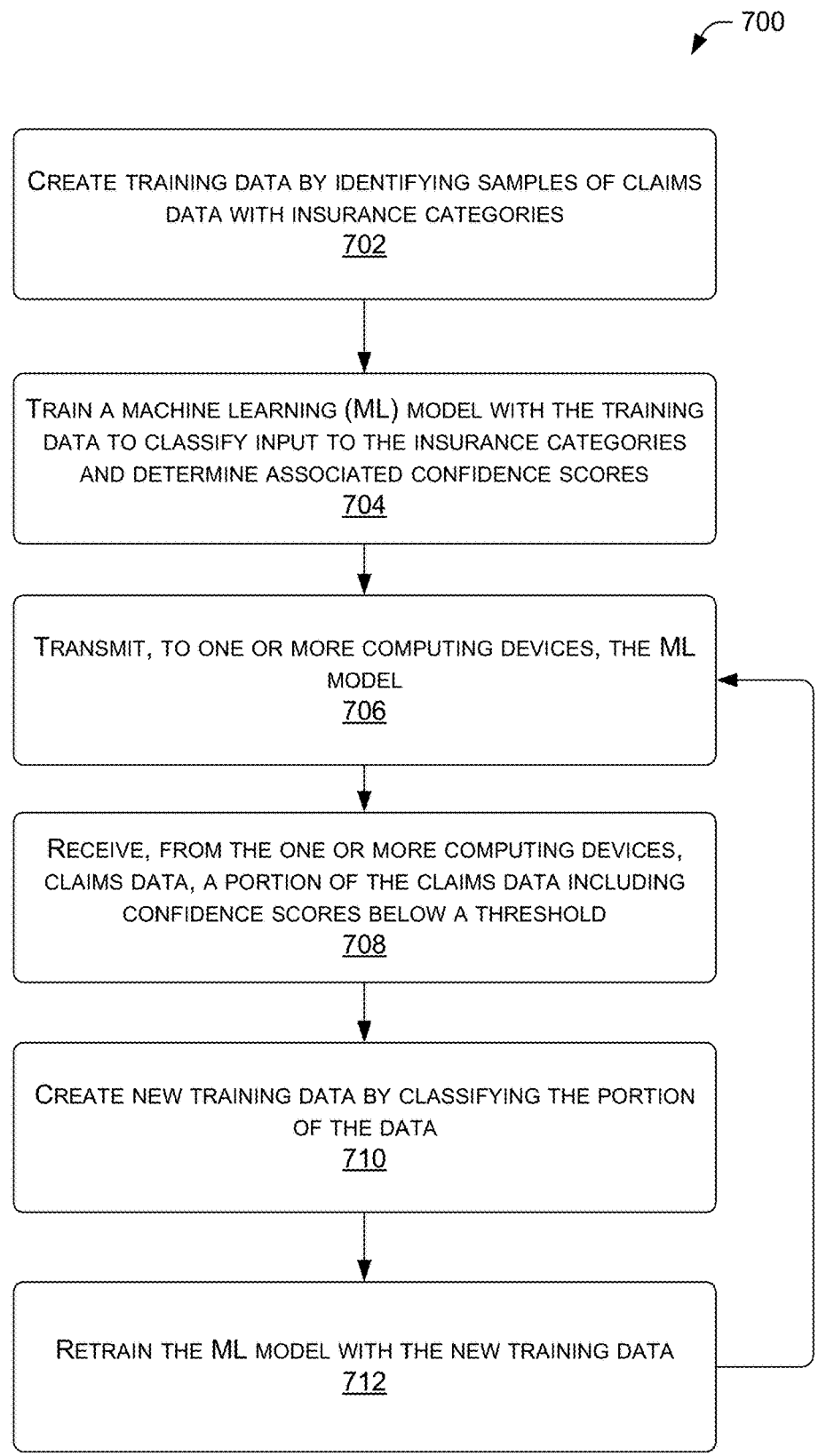
FIG. 7 illustrates an example process for training machine learning models to filter data and to retrain the machine learning models, as discussed herein.

FIGS. 5, 6, and 7 are flow diagrams of illustrative processes. The processes are illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 5 illustrates an example process 500 for receiving and classifying data and training machine learning models to classify data. In various implementations, the process 500 is described with reference to the system 100 and may be performed by the remote server(s) 104 and/or in cooperation with any one or more of the device(s) 112. Of course, the process 500 may be performed in other similar and/or different environments.

At 502, the system may receive, from one or more computing devices, unstructured data. In some examples, the system may receive unstructured data from one or more of the device(s) 112 and determine the workflow based on the information extracted. The devices 112 may be associated with any user, actor, or entity that is associated with a user account that may access the claims assistance platform to upload or download documentations associated with a claim. The user account may be assigned an actor role ("role") that grants document access based on the access policy assigned to that role. The actor roles may include but are not limited to policyholder, claimant, claim adjuster, attorney, other legal service providers, third-party vendors, agent, agent staff, service provider personnel, and the like. The unstructured data could include different types of data files (e.g., a PDF file, Word document, a JPEG file, etc.) from different sources, including vehicle damage photos, accident scene videos, photos of bills, photos of repair estimates, insurance files, audio files, video files, and the like.

At 504, the system may store the unstructured data in a native format. The system may receive unstructured data from a source and store a copy of the unstructured data in its native format before processing or otherwise editing the data file. The unstructured data may be stored in any file format, including image file format, video file format, audio file format, text file format, program file format, or compressed file format. The unstructured data as received is in its native format, which may be a different preferred file format based on the insurance categories. For instance, a repair estimate may be received in image file format (e.g., JPG), which is the native format but is not the preferred file format, which is a text file format (e.g., PDF). In some examples, the system may reformat the unstructured data to a preferred file format after storing a copy.

At 506, the system may classify the unstructured data by insurance categories. The system may classify the unstructured data into insurance categories, as described herein. Initially, the system may identify the insurance policy type (e.g., home insurance, car insurance, renter's insurance, etc.) and the incident type (e.g., flood, fire, burglary, hit-and-run, single-car accident, rear-end collision, side-impact collision, head-on collision, etc.) for the claimed incident. The system may identify a list of insurance categories for documentations based on the policy and incident type. For instance, a head-on collision may require more documentation than a simple single-car accident, and the list of insurance categories may include: police reports, vehicle damage photos for each vehicle damaged, scene of incident videos, medical bills, repair estimates, and the like. The system may classify the unstructured data to an insurance category from the list of insurance categories.

At 508, the system may tag metadata of individual data with the corresponding insurance category to form augmented data. The system may tag the information in the metadata of the data file to create augmented data. The information may include the insurance category, the claim identifier, the incident type, and/or any additional information extracted from the data file that is relevant to settling the claim (e.g., billed amount, estimate amount, etc.). The metadata may include persistent data, including but not limited to time received, time captured, and description for the data. In some examples, the system may also tag the file with access permission based on the actor role. The system may generate the augmented data to allow an agent to quickly identify and review the information relevant to settling the claim.

At 510, the system may determine a workflow from a plurality of workflows for the individual data based at least in part on the corresponding insurance category. The system may determine an event flow in response to having received a document classified by the insurance category. As described herein, based on the policy and incident type, the system may identify a list of insurance categories for documentations. Using this list, the system may generate a checklist for required documentation to settle the present claim and log the documentation on the checklist as it is received. Once the required documentation checklist is complete, the system may notify an agent to review and settle the claim. In some examples, the agent may add additional steps needed to settle the claim, and the system may log the additional steps for future workflow algorithm training.

At 512, the system may train one or more machine learning (ML) models with the augmented data to classify input data by the insurance categories. The system may train and use one or more models to perform classification on the unstructured data. As described herein, a trained model can comprise a classifier that is tasked with classifying unknown data (e.g., an unknown image) as one of a class label from multiple insurance categories (e.g., labeling the image as an estimate, a bill, or a car). The unknown data may include an image(s), a video(s), multimedia, etc. The system may create training data for machine learning models from claims data from previously settled cases and may include any combination of models to parse data files to extract information. Thus, the model(s) may be configured with text recognition, image recognition, and other functionality to process unknown data with various types of content. The system may also determine an associated confidence score for the classification, where a low confidence score defined by a confidence score below a threshold indicates a low likelihood that the class label (e.g., insurance category) is correct for the data.

FIG. 6 illustrates an example process 600 for using a trained model to classify data to categories and determine associated confidence scores. The process 600 is described with reference to the system 100 and may be performed by the device(s) 112 and/or in cooperation with any one or more of the remote server(s) 104. Of course, the process 600 may be performed in other similar and/or different environments.

At 602, the system may receive, from one or more computing devices, a trained model to classify data to insurance categories and determine associated confidence scores. The system may receive and use one or more models to perform classification on data the user is trying to upload. As described herein, a trained model can comprise a classifier that is tasked with classifying unknown data (e.g., an unknown image) as one of a class label from multiple insurance categories (e.g., labeling the image as an estimate, a bill, or a car). The unknown data may include an image(s), a video(s), multimedia, etc. The model(s) may be received from the remote server(s) 104. Thus, the model(s) may be configured with text recognition, image recognition, and other functionality to process unknown data with various types of content. The model may also determine an associated confidence score for the classification, where a lower confidence score indicates a lower likelihood that the class label is correct for the data. The system may determine that the confidence level fails to meet a threshold, and the user may be prompted to check the uploaded data.

At 604, the system may receive, from an image sensor of a user device, data including a first image data and a second image data. The user device may include any number and combination of cameras, microphones, scanners, and the like, to capture sensor data. The devices 112 can be any type of computing device, including but not limited to a laptop, a desktop computer, a tablet computing device, a server computer, a smartphone, and the like. The device(s) 112 may include components that may be used to verify and/or compress data to be transported to the remote server(s) 104. In an example, the device(s) 112 may be a smartphone with a camera that the user, who is the policyholder, has used to capture photos and/or videos related to the incident. The user may use the device(s) 112 to access the claims assistance platform to upload the photos and videos to the remote server(s) 104.

At 606, the system may apply the trained model to classify the first image data to a first insurance category and the second image data to a second insurance category. The system may use one or more models to perform classification on input data. As described herein, a trained model can comprise a classifier that is tasked with classifying unknown data (e.g., an unknown image) as one of a class label from multiple insurance categories (e.g., labeling the image as an estimate, a bill, or a car). The unknown data may include an image(s), a video(s), multimedia, etc. Thus, the model(s) may be configured with text recognition, image recognition, and other functionality to process unknown data with various types of content. The model may also determine an associated confidence score for the classification, where a lower confidence score indicates a lower likelihood that the class label is correct for the data. The categorizing component 108 may determine that the confidence level fails to meet a threshold, and the user may be prompted to check the uploaded data.

At 608, the system may determine a first confidence score for the first image data based at least in part on the first insurance category. As described in process 606, the model may also determine an associated confidence score for the classification, where a lower confidence score indicates a lower likelihood that the class label is correct for the data.

At 610, the system may determine a second confidence score for the second image data based at least in part on the second insurance category. As described in process 606, the model may also determine an associated confidence score for the classification, where a lower confidence score indicates a lower likelihood that the class label is correct for the data.

At 612, the system may transmit the first image data based on the first confidence score satisfying a threshold. The system may determine to upload data with a confidence score that meets or satisfy a threshold. In response to determining that the device is using a slow or paid data service (e.g., cellular data), the system may determine to wait or compress data transfer. In various examples, the system can request user preference on whether the device should allow the use of cellular data for transmitting large data files. The system may use one or more models or algorithms to determine the system's priority to upload the data by determining a severity score or level for the data. A higher severity score or level indicates a higher priority in having the data uploaded to the remote server(s) 104.

At 614, the system may request additional information for the second image data based on the second confidence score is less than the threshold. The system may determine that the confidence level fails to meet a threshold, and the user may be prompted to check the uploaded data.

FIG. 7 is a flow diagram of an illustrative process 700 for training machine learning models to filter data and to retrain the machine learning models. The process 700 is described with reference to the system 100 and may be performed by the remote server(s) 104 and/or in cooperation with any one or more of the device(s) 112. Of course, the process 700 may be performed in other similar and/or different environments.

At 702, the system may create training data by identifying samples of claims data with insurance categories. The system may create training data for machine learning models from claims data from previously settled cases and may include any combination of models to parse data files to extract information. Thus, the model(s) may be configured with text recognition, image recognition, and other functionality to process unknown data with various types of content.

At 704, the system may train a machine learning (ML) model with the training data to classify input to the insurance categories and determine associated confidence scores. The system may train and use one or more models to perform classification on the unstructured data. As described herein, a trained model can comprise a classifier that is tasked with classifying unknown data (e.g., an unknown image) as one of a class label from multiple insurance categories (e.g., labeling the image as an estimate, a bill, or a car). The unknown data may include an image(s), a video(s), multimedia, etc. The system may also determine an associated confidence score for the classification, where a low confidence score defined by a confidence score below a threshold indicates a low likelihood that the class label (e.g., insurance category) is correct for the data.

At 706, the system may transmit, to one or more computing devices, the ML model. The system may deploy the latest version of the trained ML model(s) to enable devices 112 to perform data verification to filter out incorrect data or to compress and/or handle data transfer for large files. The devices 112 running the trained models may also classify the data by categories and determine a confidence level for the classification. If the confidence level fails to meet a threshold, the user may be asked to verify the category and that data may be transmitted as retraining data At 708, the system may receive, from the one or more computing devices, claims data, a portion of the claims data including confidence scores below a threshold. As described in process 706, the devices 112 running the trained models may also classify the data by categories and determine a confidence level for the classification. If the confidence level fails to meet a threshold, the user may be asked to verify the category and that data may be transmitted as retraining data.

At 710, the system may create new training data by classifying the portion of the data. If the trained model(s) has low confidence (e.g., a confidence score is below a threshold) in its ability to correctly label the insurance category for an image data, this low confidence may trigger a notification for an agent or analyst to review the data with respect to its classification to the insurance category. After the data has been reviewed and/or the data is correctly labeled with an insurance category, the data may be used as additional training data to retrain the model(s).

At 712, the system may retrain the ML model with the new training data. After the data has been reviewed and/or the data is correctly labeled with an insurance category, the data may be used as additional training data to retrain the model(s). Thus, the system may retrain the model(s) with the additional training data to generate the new model(s) 216. The new model(s) may be transmitted to the devices 112 in a continuous retraining cycle to improve the classifier. Accordingly, the process 712 may return to process 706 to transmit the latest trained model(s) to the device(s) 112, receive new training data back from the device(s) 112, and retrain the model(s) to continuously improve the model(s) in this data processing loop.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
computer-readable media storing first computer-executable instructions that, when executed by the one or more processors, cause the one or more processors to perform operations comprising:
  receiving a plurality of electronic files containing information associated with previously settled claims;
  determining, for individual electronic files of the plurality of electronic files and based on the information contained in the individual electronic files, insurance categories;
  generating training data comprising samples of images in the plurality of electronic files, wherein generating the training data includes adding labeled metadata to individual samples of images, the labeled metadata identifying the insurance categories;
  training a machine learning (ML) model with the training data to:
    extract text information from image input data,
    classify the image input data with image input data classifications and based on the labeled metadata,
    determine image quality data for the image input data, and
    determine confidence scores for the image input data classifications, wherein the image input data may be in one or more file formats;
  receiving image data associated with insurance claims documents for an insurance claim;
  executing the ML model using the image data as first input to generate first structured information comprising text data, a first insurance category, an image quality of the image data, and a first confidence score for the first insurance category as first output;
  determining that the first confidence score meets or exceeds a first threshold;
  based on the image quality, and on determining that the first confidence score meets or exceeds the first threshold:
    generating metadata indicating the first structured information and the first insurance category; and
    generating, based on the first insurance category, a first workflow for the metadata, the first workflow including performing advanced data analysis associated with the first insurance category on the image data;
  determining, based on performing the advanced data analysis on the image data, a type of structured information to indicate in the metadata;
  generating a user interface;
  in response to receiving unstructured data via the user interface, executing the trained ML model using the unstructured data as second input to generate second structured information of the type of structured information and a second insurance category of the insurance categories corresponding to the unstructured data as second output;
  determining, based on the second insurance category, a second confidence score for the second structured information;
  determining that the second confidence score is less than a second threshold; and
  generating, based on determining that the second confidence score is less than the second threshold, a second workflow for the metadata, the second workflow including generating a notification to request additional documentation for the insurance claim.

2. The system of claim 1, wherein:
the operations further comprise, further based on the image quality, and on determining that the first confidence score meets or exceeds the first threshold and the image quality:
  augmenting the training data with the image data, the first structured information, and the first insurance category; and
  retraining the trained ML model using the augmented training data to generate a retrained ML model; and
  executing the trained ML model using the unstructured data as the second input to generate the second structured information and the second insurance category as the second output comprises executing the retrained ML model using the unstructured data as the second input to generate the second structured information and the second insurance category as the second output.

3. The system of claim 1, wherein the second workflow further includes augmenting the metadata with the first structured information.

4. The system of claim 1, wherein determining the first workflow includes:
  determining a first native format of the image data is different from a preferred file format associated with the first insurance category, wherein the first insurance category is associated with an insurance policy or an insurance claim type; and
  determining to reformat the image data to be stored as the first preferred file format.

5. The system of claim 1, wherein the image data includes an image of at least one of repair estimates, emails, police reports, or medical bills.

6. The system of claim 1, wherein the metadata indicates a medical bill and executing the trained ML model to generate the second structured information as output comprises:
  executing the trained ML model to generate the second structured information including one or more of a cost of medical service or a service provider name.

7. The system of claim 1, wherein the metadata indicates a repair estimate and executing the trained ML model to generate the second structured information as output comprises:
  executing the trained ML model to generate the second structured information including one or more of an estimated cost to repair or an auto shop name.

8. The system of claim 1, the operations further comprising:
  creating new training data by identifying sample data from stored data including the metadata; and
  generating one or more new ML models with the new training data to classify input by the insurance categories.

9. The system of claim 1, the operations further comprising:
  generating a second user interface to present the insurance claims documents for viewing;
  receiving a request to view a first document of the insurance claims documents, the first document associated with the image data;
  retrieving the image data in a native format; and
  presenting the image data for viewing.

10. A method, comprising:
  receiving a trained model trained to extract text information from image input data classify the image input data with image input data classifications and based on payout amount, determine image quality data for the image input data, and determine confidence scores for the image input data classifications, wherein the trained model is trained using training data comprising samples of images in claims data and respective labeled metadata indicating payout amounts corresponding to the claims data;

generating a user portal to receive insurance claims documents;

receiving, from a computing device via the user portal, image data associated with an insurance claim from a user account;

executing the trained model using the image data as first input to generate first structured information comprising text data, a first insurance category, an image quality of the image data, and a first confidence score for the first insurance category as first output;

determining that the first confidence score meets or exceeds a first threshold;

based on the image quality, and on determining that the first confidence score meets or exceeds the first threshold:
  generating metadata indicating the first structured information and the first insurance category; and
  determining, based on the first insurance category, a first workflow for the metadata, the first workflow including performing advanced data analysis on the image data;

determining, based on performing advanced data analysis on the image data, a type of structured information to indicate in the metadata;

generating a user interface;

in response to receiving unstructured data via the user interface, executing the trained model using the unstructured data as second input to generate second structured information of the type of structured information and a second insurance category of the insurance categories corresponding to the unstructured data as second output;

determining, based on the second insurance category, a second confidence score for the second structured information;

determining that the second confidence score is less than a second threshold;

generating, based on determining that the second confidence score is less than the second threshold, a second workflow for the metadata, the second workflow including generating a notification for the unstructured data; and causing to present, via the user portal, the notification for the user account.

11. The method of claim 10, where performing advanced data analysis on the image data comprises:
  determining the image data includes a vehicle photo and a license plate number; and
  determining to indicate the license plate number in the metadata.

12. The method of claim 10, further comprising:
  creating the training data by identifying sample data from settled claims, individual data of the sample data including first labels with claims categories;
  generating a trained machine learning (ML) model with the training data to classify input by the claims categories and to determine associated confidence scores;
  receiving, from the computing device, the claims data, wherein a portion of the claims data includes confidence scores below a third threshold;
  creating second training data by identifying incorrectly classified data in the portion of the claims data;
  labeling the second training data by correct insurance categories; and
  generating a second trained ML model with the second training data.

13. The method of claim 10, wherein:
  the method further comprises, further based on determining that the first confidence score meets or exceeds the first threshold and the image quality:
    augmenting the training data with the image data, the first structured information, and the first insurance category; and
    retraining the trained model using the augmented training data to generate a retrained model; and
  executing the trained model using the unstructured data as the second input to generate the second structured information and the second insurance as the second output comprises executing the retrained model.

14. The method of claim 12, further comprising:
  creating third training data by identifying sample image data from the settled claims, the sample image data including vehicle damage photos, and individual image data of the sample image data including second labels with severity levels; and
  generating a third trained ML model with the third training data to classify input by the severity levels, and wherein performing advanced data analysis includes applying the third trained ML model to classify the unstructured data by a severity level.

15. The method of claim 14, further comprising:
  determining that the severity level meets or exceeds a total loss threshold, and wherein the second workflow includes generating a second notification for an agent to review the insurance claim and triggering an event flow payment for total loss.

16. The method of claim 14, further comprising:
  determining that the severity level is below a total loss threshold, and wherein the second workflow includes determining that claims documentation is complete for the insurance claim and generating a second notification for an agent to review and settle the insurance claim.

17. One or more non-transitory computer-readable media storing computer executable instructions that, when executed, cause one or more processors to perform operations comprising:
  receiving a trained machine learning (ML) model trained to extract text information from image input data and classify the image input data with image input data classifications and based on severity level, determine image quality data for the image input data, and determine confidence scores for the image input data classifications, wherein the trained ML model is trained using training data comprising samples of images in claims data and respective labeled metadata indicating severity levels corresponding to the claims data;
  generating a user portal to receive insurance claims documents;
  receiving image data associated with insurance claims documents for an insurance claim;
  executing the trained ML model using the image data as first input to generate first structured information comprising text data, a first insurance category, an image quality of the image data, and a first confidence score for the first insurance category as first output;

determining that the first confidence score meets or exceeds a first threshold;

based on the image quality, and on determining that the first confidence score meets or exceeds the first threshold:
   generating metadata indicating the first structured information and the first insurance category; and
   determining, based on the first insurance category, a first workflow for the metadata, the first workflow including performing advanced data analysis on the image data;

determining, based on performing advanced data analysis on the image data, a type of structured information to indicate in the metadata;

generating a user interface;

in response to receiving unstructured data via the user interface, executing the trained ML model using the unstructured data as second input to generate second structured information of the type of structured information and a second insurance category of the insurance categories corresponding to the unstructured data as second output;

determining, based on the second insurance category, a second confidence score for the second structured information;

determining that the second confidence score is less than a second threshold; and generating, based on the determining that the second confidence score is less than the second threshold, a second workflow for the metadata, the second workflow including generating a request for additional information associated with the second structured information.

18. The one or more non-transitory computer-readable media of claim 17, wherein the second insurance category is a repair estimate and the operations further comprise:
   generating a second user interface to present the request for additional information, wherein the request for additional information includes a request for confirmation that the second insurance category is the repair estimate and a request for an estimated amount;
   causing the second user interface to present the request for additional information; and
   performing optical character recognition (OCR) on third unstructured data received via the second user interface.

19. The one or more non-transitory computer-readable media of claim 18, the operations further comprising:
   determining to indicate the estimated amount in the metadata.

20. The one or more non-transitory computer-readable media of claim 18, the operations further comprising:
   causing the second user interface to present a request to replace the third unstructured data with fourth unstructured data based at least in part on the OCR failing to recognize the estimated amount in the third unstructured data.

* * * * *